C. Albert.

Animal Stock.

N° 77,435.   Patented May 5, 1868.

Witnesses
J. W. Burridge
K. Corn

Inventor
C. Albert

United States Patent Office.

C. ALBERT, OF HARRISVILLE, OHIO.

Letters Patent No. 77,435, dated May 5, 1868.

IMPROVED SHEEP-HOLDER.

The Schedule referred to in these Letters Patent and making part of the same.

TO ALL WHOM IT MAY CONCERN:

Be it known that I, C. ALBERT, of Harrisville, in the county of Medina, and State of Ohio, have invented certain new and useful Improvements in Sheep-Holders; and I do hereby declare that the following is a full and complete description of the same, reference being had to the accompanying drawings, making a part of this specification, in which—

Figure 1:
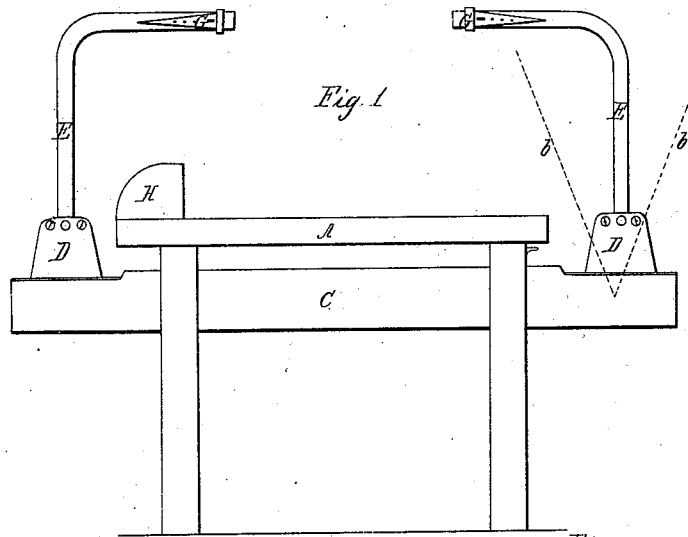
Figures 2, 3:
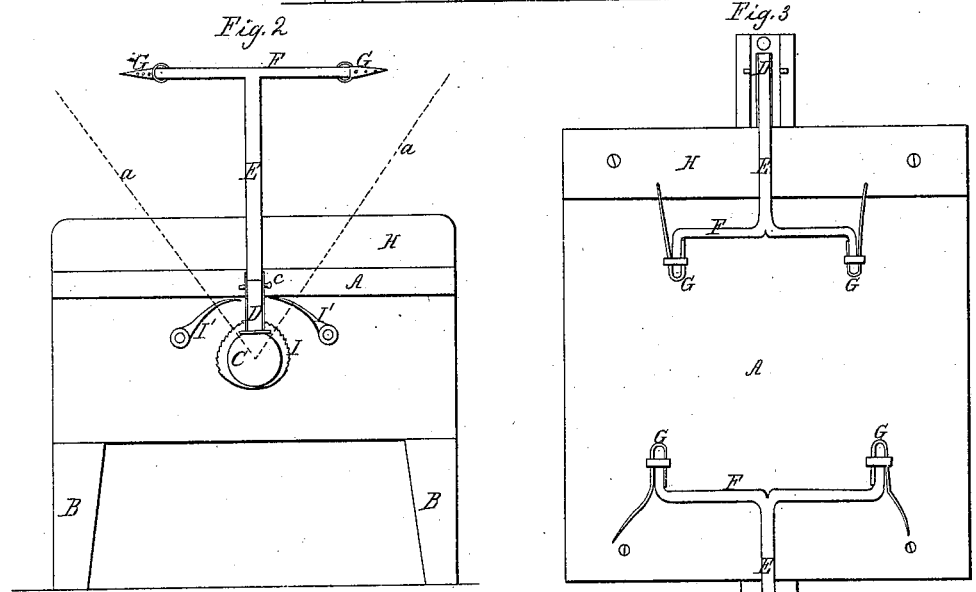

Figure 1 is a side view of the holder.
Figure 2 is an end view.
Figure 3 is a top view.
Like letters of reference refer to like parts.

My invention relates to the construction of a sheep-table or holder, it being an improvement of a former machine, for which a patent was granted to me, the construction and operation of which is as follows:

In fig. 1, A represents the top of the table, of which B are the legs. C is a shaft or roller, its bearings resting in the side-rails of the table. D are socket-stays secured to the projecting ends of the shaft, and in which are inserted and braced the standards E. The ends of said standards are pivoted in the roller, thereby allowing to them vibratory movement toward and from the table, for a purpose hereafter shown. From the upper end of the standards proceed the arms F, the extremities of which are furnished with a strap and buckle, G.

The practical operation of this machine is as follows, viz:

The sheep is laid upon the table, with its neck resting upon the pillow H, to which it may be secured by a strap. Should the animal be refractory, the limbs of the sheep are stretched out and secured to the arms F by the toggle G. The animal in this condition can be turned over on either side, more or less, to suit the convenience of the shearer, by pushing the standards in either direction, as indicated by the dotted lines $a$, fig. 2, and which may be secured in any one position by the pawls and ratchet-wheel I I'.

In the former machine referred to, the standards were four in number, two at each end of the shaft, branching outward from each other, as indicated by the dotted lines $a$. Said standards were fixed rigidly to the shaft, so that they could not be moved for adjustment.

The objection to this machine was, that the standards, being two in number, and branching, were found to be in the way of the operator, so that a free access could not be had to the sheep. This obstruction rendered the table inconvenient and often impracticable. Also, the standards being rigidly fixed to the shaft, could not be adjusted in the direction indicated by the dotted lines $b$, fig. 1, for the purpose of adapting the standards to different-sized or lengthed sheep. Hence a small animal could not be secured on the table constructed for a large one without greatly stretching the creature, which rendered its position unnatural and painful to be borne. But by using a single standard, and pivoting it in the roller, as above described, this objection is avoided, as the standards can be moved inward or outward, so as to adjust them to any length of sheep, and when so adjusted, are securely retained by the insertion of a pin, $c$, in either of the holes observed in the socket-stay D.

By this construction and arrangement of the machine, it is much more convenient and useful, and better adapted to the purpose intended than the old machine alluded to.

What I claim as my improvement, and desire to secure by Letters Patent, is—

The adjustable standards E, arms F, in combination with the socket-stays D and rollers C, in the manner as and for the purpose set forth.

C. ALBERT.

Witnesses:
J. H. BURRIDGE,
J. HOLMES.